United States Patent Office 3,101,258
Patented Aug. 20, 1963

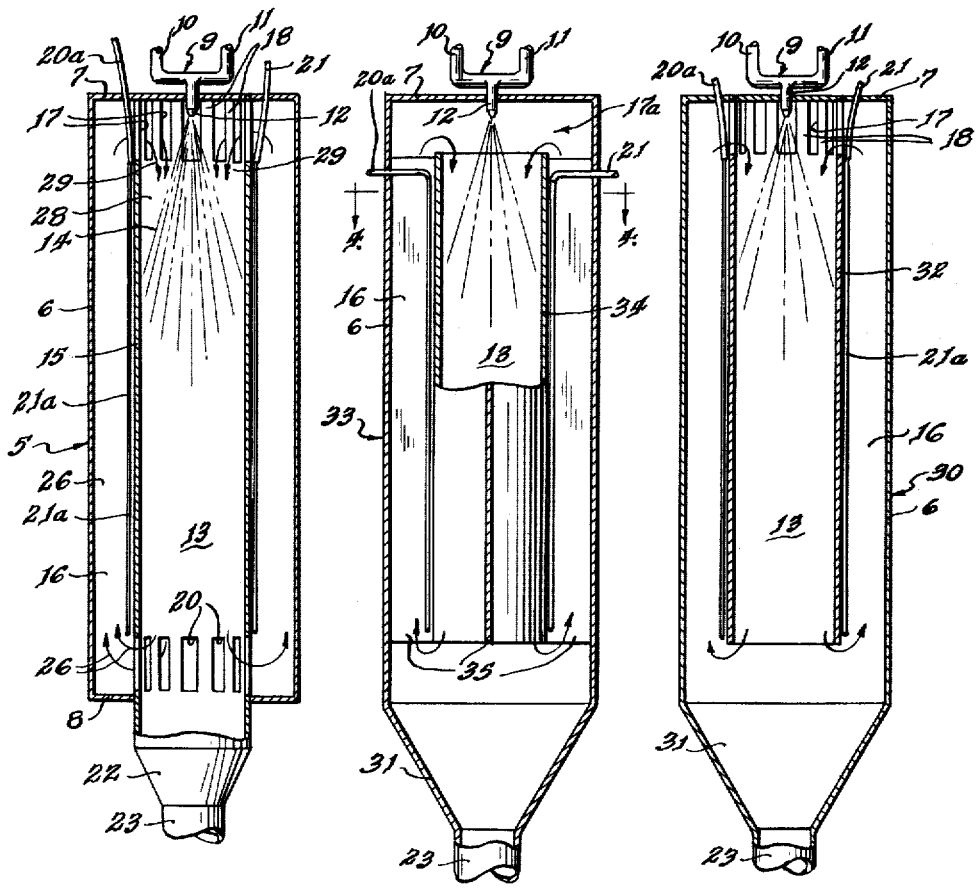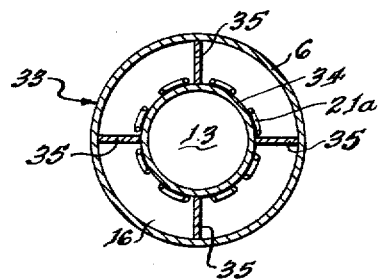

3,101,258
SPRAY CALCINATION REACTOR
Benjamin M. Johnson, Kennewick, Wash., assignor to the United States of America as represented by the United States Atomic Energy Commission
Filed June 14, 1961, Ser. No. 117,243
7 Claims. (Cl. 23—277)

The invention relates to a novel spray calcination reactor, more particularly to such a reactor to calcine the radioactive waste solutions and slurries resulting from the reprocessing of fuel elements taken from nuclear reactors.

Waste solutions, the aqueous solutions remaining after uranium and other fissionable fuel values have been extracted from dissolved irradiated fuel elements, are not suitable for storage. In addition to being bulky they contain many dangerously radioactive fission products in water-soluble form such as nitrates, sulfates, and chlorides depending, of course, on the particular acid used to dissolve the fuel elements. It is therefore desirable to dehydrate and calcine these to oxides both to reduce bulk and to place the radioactivity in a water-insoluble condition so that should an accidental leak develop in the container in which they are stored, their escape and percolation into the ground would be inhibited. Likewise the salts of the fuel element structural materials, such as aluminum, iron, chromium and the like, are more easily stored as oxides for similar, if less compelling reasons.

While the concentrations of fission products in the waste solutions are comparatively small, those of the structural materials are large, in fact, they are often saturated with these to the point where precipitation has taken place and the solutions are more accurately spoken of as slurries. Whether precipitation has actually occurred or not for a given waste solution, it soon will if an attempt is made to reduce the bulk of the solution by evaporation, and before long a tenacious deposit will take place on the bottom and sides of the evaporation vessel, which deposit is difficult to remove by the remote control manipulation which is always necessary when fission products are being handled. Consequently, it has become increasingly common to avoid evaporation and, instead, to spray a waste solution into a calcination reactor, preferably cylindrical in shape and with the spray issuing from a nozzle at the top, impelled by a gas such as steam.

Various refinements in calcining have been devised to improve its efficiency and suppress the generation of dust which is extremely troublesome due to its radioactivity. Inorganic additives such as phosphates, silicates and the like result in a bead-like calcination product with less dust than previously; sugar is added to obtain somewhat similar results. While these measures have been successful in reducing the dust problem, they tend to aggravate another problem in the calcination process, clogging of the equipment. The calcined particles often cling to the walls of the calcination reactors, particularly in a region a short distance downstream from the spraying nozzle. Once a small deposit of particles is started it tends to build up rapidly, making a shutdown necessary to clean out the reactor.

It is, accordingly, an object of the invention to provide a calcination reactor for nuclear reactor waste solutions which will be less subject to clogging by calcined particles than such reactors now known.

Other objects of the invention will appear as the description proceeds.

Clogging of a reactor as above described is due to the fact that the spray issuing from the nozzle into the reactor acts as a free expanding jet, entraining a very large quantity of gas into the boundary of the jet as the propelling gas such as steam, droplets of waste solution and the calcined particles are decelerated to their terminal velocity through the reactor. Since the reactor is a confined space, this entrained gas can only be supplied from lower downstream regions of the reactor and the resultant back-mixing of the gas carries along incompletely dried particles which tend to adhere to the sides of the reactor column. If this back-mixing could be eliminated, or if a means could be devised of allowing only completely dried particles to recycle along with the gas to the top of the reactor column, the buildup of particles near the top of the column could be suppressed.

At the same time the amount of gas within the reactor must be limited; if, for example, an attempt were made to remedy the back-mixing and particle deposition above described by introducing a fresh supply of gas from outside the reactor and thereby provide a sweeping action to keep the reactor walls clean, ten or more times the volume of gas in the jet from the spray nozzle would be necessary. This would cool the reactor to the point where the calcining action would cease, or else economically prohibitive amounts of heat would have to be supplied.

To remedy this I have devised a novel reactor structure whereby gas from the lower zone is suppled to the region of the nozzle jet where the entrainment mentioned takes place; this results, first, in only completely dried particles being in the entrained gas, and second, in the elimination of back-mixing of the gases from the immediate downstream regions of the reactor. Consequently deposition on the walls of the reactor is suppressed.

My invention will now be explained in detail with reference to the accompanying drawings, in which FIG. 1 is a longitudinal sectional view of one embodiment of the invention.

FIG. 2 is a longitudinal sectional view of another embodiment of the invention.

FIG. 3 is a longitudinal sectional view of a third embodiment of the invention.

FIG. 4 is a sectional view taken on the line 4—4 of FIG. 3.

The calcination reactor of FIG. 1 is designated generally by 5. 6 is an outer shell, preferably cylindrical, of the reactor 5, and 7 its top, and 8 its bottom. Mounted on top 7 is a nozzle antechamber 9, to which are connected a gas-supply line 10 and solution-carrying line 11 for a nuclear-reactor-waste solution, or other solution to be calcined. A nozzle 12 is connected with antechamber 9 and extends therefrom through top 7 into an interior chamber 13 of the reactor and sprays the solution to be calcined in a conical jet 14 of particles and droplets of liquid from the solution under treatment.

Within the outer shell 6, there lies an inner shell 15, preferably cylindrical, which with the top 7 defines the interior chamber 13. The inner shell 15, which is preferably coaxial with the outer shell 6, extends the length of the outer shell and is of appreciably smaller diameter than the outer shell so as to be spaced therefrom throughout its length. The shells 6 and 15, top 7, and bottom 8 define an outer annular chamber 16. The upper end of the inner shell 15 has a plurality of spaced longitudinal slots 17 distributed thereabout. Portions 18 of inner shell 15, separating the slots 17, are connected to the top 7. Just above the bottom 8, the inner shell 15 has a plurality of spaced longitudinal slots 20 distributed thereabout. Wires 20a and 21 carry an electric current to a heater 21a which fits snugly around the outside of the inner shell 15 for most of its length. Heater 21a is shown as an insulated resistance heating element extending back and forth along the length of the inner shell 15 and around it.

Below the bottom 8 of the reactor, the inner shell 15 is connected through a frustoconical section 22 with a product-recovery line 23 leading to powder removal means (not shown), dust filters (not shown), and condensers and liquid removal means (not shown). Line 23 is reduced in size as compared to the inner shell 15 in order to regulate the flow of gas in line 23, as will be apparent.

In operation, as conical jet 14 widens to a width equal the inner diameter of chamber 13, the jet retains two components of force, one downward in the direction of product-recovery line 23, and the other outward perpendicular to the inner shell 15. As the mixture of gases and particles passes down through inner shell 15, calcining is brought about by the heat from the inner shell 15. As the mixture reaches the lower slots 20, some of it moves outward into outer chamber 16 and turns upward as shown by arrows 26, and the balance continues down through product-recovery line 23. The portion of the mixture of gases and particles in outer chamber 26 moves upward therethrough to the upper slots 17 and passes radially inward and downward therethrough as indicated by arrows 29 into a boundary region 28 of the jet 14. Since all the particles thus entering boundary region 28 have passed over the full length of the outer side of the heated inner shell 15, they are calcined and completely dried, and as they become entrained in jet 14, the number of incompletely dried particles in jet 14 is thereby reduced.

In FIG. 2, a modified reactor 30 of the present invention has an outer shell 6, a top 7, antechamber 9, gas-supply line 10, solution-carrying line 11, and nozzle 12, all arranged as in the reactor 5 of FIG. 1. In the reactor 30, the lower end of the outer shell 6 is connected by a frustoconical section 31 with a product-recovery line 23. The reactor 30 has a heated inner shell 32, which is like the inner shell 15 of the reactor 5 of FIG. 1 in being preferably cylindrical and coaxial with and spaced from the outer shell 6 and in leaving its upper end joined to the top 7 by portions 18 separating longitudinal slots 17. The lower end of the inner shell 32 is unslotted and lies free somewhat above the lower end of the outer shell 6. The inner shell 32 and top 7 define inner chamber 13, and the inner and outer shells 32 and 6 and top 7 define outer annular chamber 16.

In FIGS. 3 and 4, a second modified reactor 33 has outer shell 6, top 7, antechamber 9, gas-supply line 10, solution-carrying line 11, nozzle 12, frustoconical section 31, and product-recovery line 23 all arranged as in the reactor 30 of FIG. 2. The reactor 33 also has a heated inner shell 34, preferably cylindrical, having an upper end spaced from the top 7 and a lower end somewhat above the lower end of the outer shell 6. The inner shell 34 which is coaxial with the outer shell 6 and spaced therefrom, is supported from the outer shell by means of four radial strips 35, which are preferably spaced 90° from one another about the inner shell. Wires 20a and 21 for heater 21a applied to the exterior of the inner shell are shown as extending outwardly along the strips 35 and through the outer shell 6. The inner shell 34 defines inner chamber 13. Outer and inner shells 6 and 34 define outer annular chamber 16.

Certain features of the above construction are critical within limits. The cross-sectional area of the outer annular chamber 16 should be at least 85% of the cross-sectional area of the inner chamber 13. In the embodiments of FIGS. 1 and 2, the combined width of each of the sets of slots 17 and 20 should be at least equal to the cross-sectional area of the outer annular chamber 16. The portions 18 of the shell 15 between the slots 17 should not be so narrow as to become too weak to hold the shell 15 in place. The same is true of the portions of the shell 15 between the slots 20. This will, of course, depend to some extent on other factors such as the temperature of the calcination, the makeup of the waste solution under treatment, the pressure of the impelling gas, the kind of nozzle used, and the like. These are details of operation that do not go to the essence of my invention which may be modified to meet the variables mentioned.

In carrying out the invention, any type of atomizing nozzle may be used. With a pneumatic atomizing nozzle of the internal mixing type, the ratio of the volume of impelling gas to that of the liquid solution sprayed into the reactor may range from about 275 to 600; above the latter value the particles of the calcination product become undesirably small, while below it particle deposition takes place. I prefer a ratio of from about 275 to 375.

Any gas which does not interfere with the calcination reaction may be used as the impelling gas, such as air, oxygen or steam. Steam, however, is preferred since it reduces the off-gas to be handled and it also has superior heat transfer properties. Whatever the gas used, it should be preheated in order to avoid cooling the reactor. The pressure of the impelling gas may vary quite widely, from about 20 to 100 p.s.i.g.

The temperature of the calcination will, of course, depend to a large degree on the decomposition temperature of the predominant anion and, to some extent, on the predominant cation in the solution being calcined. Where these are nitrate and aluminum, temperatures in the range of 400° to 600° C. are sufficient. When the predominant anion is sulfate, the temperature must be substantially over 770° C., preferably around 1000° C. Decomposition temperatures of the various salts in the calcined solution or slurry are all well known to the art, and the reactor of the invention should be operated in accordance with these known data.

*Example*

A calcination reactor along the lines of the embodiment shown in FIG. 1 is made 4 feet in length from the top 7 to the bottom 8. The tops of the inlet slots 19 are placed 37 inches below the tip of the nozzle 12, and are 2½ inches wide. The outlet slots 17 are the same width and 6 inches longer from the top 7 of the reactor.

A simulated nuclear reactor waste solution having a density of 1.28 grams per cc. has the following composition: 6.0 M H$^+$, 0.25 M Fe$^{+3}$, 0.10 M Al$^{+3}$, 1.0 M Na$^+$, 0.01 M Cr$^{+3}$, 0.006 M Ni$^{+2}$, 0.53 M SO$_4{}^{-2}$, 0.02 M PO$_4{}^{-3}$, 7.1 M No$_3{}^-$.

This solution is introduced into the calcination reactor above described, drawing at the rate of 6 liters per hour through a nozzle of the internal mixing type with steam as the impelling gas. The inner diameter of the nozzle orifice for the liquid was 0.055 inch and that of coaxial orifice for the steam was 0.10 inch. The ratio of the volume of impelling steam to that of the liquid solution is about 325.

The impelling steam is preheated to 200° C. and the reactor is kept at a calcination temperature of 800° C.

It will be understood that this invention is not to be limited to the details given herein, but that it may be modified within the scope of the appended claims.

What is claimed is:

1. A spray calcination reactor comprising an outer shell, an inner shell in coaxial relation with the outer shell, the said inner shell defining an inner reaction chamber and the said inner shell and outer shell together defining a single annular outer reaction chamber, heating means in intimate association with the inner shell through a substantial portion of its length, means adjacent the top of the reactor for spraying downwardly and unobstructedly into the inner shell, an impelling gas line and a fluid carrying line in communication with the means for spraying, the said inner chamber and the said annular outer chamber being separated from each other along the greater portion of their lengths by the inner shell and in communication with each other through open regions, an upper open region adjacent the upper end of the inner shell and a lower open region adjacent the lower end of the inner shell, and a solids product recovery outlet through the outer shell, coaxial with and directly beneath the inner shell and opposite the said means for spraying.

2. The reactor specified in claim 1, the inner and outer shells being cylindrical.

3. The reactor specified in claim 2 and further comprising a top and bottom at the ends of the outer shell, the ends of the inner shell being connected to the top and bottom, the open regions at the ends of the inner shell being sets of spaced longitudinal slots formed in the ends of the inner shell and distributed thereabout.

4. The reactor specified in claim 2 and further comprising a top at one end of the outer shell, one end of the inner shell being connected to the top, the open region at said one end of the inner shell being a set of spaced longitudinal slots formed in the said one end of the inner shell and distributed thereabout.

5. The reactor specified in claim 4, the combined area of the slots being at least equal to the cross-sectional area of the outer annular chamber.

6. The reactor specified in claim 2, the means supporting the inner shell in the outer shell being a plurality of radial members extending between the shells and distributed about the inner shell.

7. The reactor of claim 2 wherein the cross-sectional area of the outer annular chamber is at least 85% of the cross-sectional area of the inner chamber.

References Cited in the file of this patent

UNITED STATES PATENTS

| | | |
|---|---|---|
| 1,624,739 | Jones | Apr. 12, 1927 |
| 2,445,327 | Keith | July 20, 1948 |
| 2,610,109 | Adams et al. | Sept. 9, 1952 |
| 2,635,952 | D'Onville | Apr. 21, 1953 |
| 2,806,768 | Bender et al. | Sept. 17, 1957 |

FOREIGN PATENTS

| | | |
|---|---|---|
| 476,113 | Italy | Nov. 28, 1952 |
| 1,096,877 | Germany | Jan. 12, 1961 |

UNITED STATES PATENT OFFICE

CERTIFICATE OF CORRECTION

Patent No. 3,101,258                               August 20, 1963

Benjamin M. Johnson

It is hereby certified that error appears in the above numbered patent requiring correction and that the said Letters Patent should read as corrected below.

Column 4, line 31, for "19" read -- 20 --.

Signed and sealed this 20th day of October 1964.

(SEAL)
Attest:

ERNEST W. SWIDER
Attesting Officer

EDWARD J. BRENNER
Commissioner of Patents